(12) United States Patent
Schneider (10) Patent No.: US 6,209,258 B1
(45) Date of Patent: Apr. 3, 2001

(54) EXTENDABLE LOCKING POTTED PLANT SUPPORT

(76) Inventor: Margie Schneider, 51347 Range Rd. 232, Sherwood Park (CA), T8B 1K8

( * ) Notice: Subject to any disclaimer, the term of this patent is extended or adjusted under 35 U.S.C. 154(b) by 0 days.

(21) Appl. No.: 09/252,075

(22) Filed: Feb. 18, 1999

(30) Foreign Application Priority Data

Feb. 13, 1998 (CA) .................................................. 2254039
Feb. 23, 1998 (CA) .................................................. 2230164

(51) Int. Cl.$^7$ .......................... A01G 17/06; A01G 17/14
(52) U.S. Cl. .................................................... 47/46; 47/70
(58) Field of Search .................................. 47/70, 46, 44, 47/41.01, 41.14, 41.15, 63; 248/27.8; D11/164

(56) References Cited

U.S. PATENT DOCUMENTS

| | | |
|---|---|---|
| D. 260,960 | 9/1981 | Malia . |
| D. 292,475 | 10/1987 | Kitchen . |
| D. 335,802 | 5/1993 | Klump . |
| D. 348,858 | 7/1994 | Nuosce . |
| D. 349,472 | 8/1994 | Olswanger . |
| D. 362,206 | 9/1995 | Nuosce . |
| 4,020,592 | 5/1977 | Saunders . |
| 4,074,461 | 2/1978 | Hirschman . |
| 4,128,965 | 12/1978 | D'Hondt . |
| 4,164,094 | 8/1979 | Kempka . |
| 4,503,636 * | 3/1985 | Stuckey ..................................... 47/44 |
| 4,534,129 | 8/1985 | Stuckey . |
| 4,584,792 | 4/1986 | Etzel . |
| 4,750,293 | 6/1988 | Dyke . |
| 4,881,342 | 11/1989 | Ferguson . |
| 4,993,184 * | 2/1991 | Howe ........................................ 47/4 |
| 5,327,678 | 7/1994 | Schweiker . |
| 5,349,780 | 9/1994 | Dyke . |
| 5,501,038 | 3/1996 | Gregoranto . |
| 5,542,209 * | 8/1996 | Sheu ....................................... 47/44 |
| 6,067,751 * | 5/2000 | Payr ....................................... 47/70 |

FOREIGN PATENT DOCUMENTS

| | | |
|---|---|---|
| 0058738 * | 9/1982 | (EP) . |
| 2035027 * | 6/1980 | (GB) . |
| 2244632 * | 12/1991 | (GB) . |
| 2247816 * | 3/1992 | (GB) . |

* cited by examiner

Primary Examiner—Peter M. Poon
Assistant Examiner—Judith A. Nelson
(74) Attorney, Agent, or Firm—Bennett Jones LLP (57) ABSTRACT

A potted plant support system which has a flat base member which is securable to a plant pot by with a key which secures the base member to the pot. The key may be shaped to fit in slot-like openings in the base member and the pot. The plant is supported by rods which may be notched to retain plant ties. The system may also include a pot support clip which engages the pot periphery and includes a rod support extension. Also disclosed is a plant support hook which slidingly engages the rods and which releasably engages itself to form a plant retaining loop.

16 Claims, 7 Drawing Sheets

FIG. 10C ically related to the nation, the potted plant support
EXTENDABLE LOCKING POTTED PLANT SUPPORT

TECHNICAL FIELD

The present invention relates to potted plant support systems.

BACKGROUND OF THE INVENTION

Many varieties of potted plants require some kind of mechanical support for growth indoors. The ordinary wooden stake or stick typically used for this purpose is often unsatisfactory because it is inadequately anchored by the loose potting soil. The stake may shift out of position and may not support the plant. Further, as the plant grows, the original stake may be too short for the plant and may not easily be replaced.

In U.S. Pat. No. 5,327,678 to Schweiker, there is described a hollow extendable support post for plants. In this system, the support post rests on a base member which lies flat at the bottom of the pot. This system relies on the weight of the potting soil on the base member to secure it in position and avoid the difficulties referred to above. However, it has been found that this is also insufficient to prevent shifting of the support post. Furthermore, this system may not be used for self-watering pots which have a protrusion in the bottom of the pot to allow water to enter the pot.

In U.S. Pat. No. 5,501,038 to Gregoranto, there is described another plant support device which improves on the ordinary wooden stake. In this device, radially extending fingers in the horizontal plane support the vertical support rod. However, this device also suffers from instability because of the flexibility of the fingers and their propensity to shift within the pot.

In these prior art devices, the support rod is off-set from the centre of the pot so as to provide room for the plant itself which is typically centred in the pot. If the plant begins to lean towards the rod, the base for the rod is more likely to shift within the pot and may not adequately support the plant.

Another difficulty with prior art devices is the lack of a stable and convenient means for securing the plant to the support rod. Typically, the user must tie a short string around the plant and the rod. This string does not easily move upwards as the plant grows and additional strings must be used. Also, the string has no vertical support on the support rod and will slip downwards if not supported by the plant itself.

Therefore, there is a need in the art for an extendable plant support system which may easily and conveniently be secured to the pot. It would be advantageous for such a system to include convenient means for securing the plant to the support system which allows for adjustment as the plant grows.

SUMMARY OF THE INVENTION

In general terms, the invention comprises a potted plant support system for use with a plant pot having a bottom inner surface having at least one aperture which has a base member which is securable to a plant pot by means of a key which clips the base member to the pot. The key may be shaped to fit in slot-like openings in the base member and the pot. The plant is supported by plant support rods which may have support wedges or be notched to retain plant ties. Also disclosed is a plant support loop which slidingly engages the support rods and which releasably engages itself to form a plant retaining loop.

In one aspect of the invention, the potted plant support system comprises:

(a) a substantially flat base member which may lie at the bottom of the pot, the base member having at least one opening which aligns with an aperture of the pot;

(b) means for removably securing the base member to the pot, said securing means extending through the at least one opening and the at least one aperture;

(c) at least one plant support rod;

(d) rod holding means associated with the base member for holding the plant support rod in a substantially vertical position.

In another aspect of the invention, the potted plant support system comprises a vertical plant support rod and a clamp for engaging the peripheral edge and a support rod positioner for engaging the plant support rod and restricting lateral movement of the rod.

In another aspect of the invention, the potted plant support system comprises a plant support system comprising a vertical support rod and a support clip, said clip comprising a clamp for engaging the peripheral edge of a pot, an intermediate portion extending inward from the clamp and a rod support sleeve which is supported by the intermediate portion and which may engage the support rod and hold it in a vertical position.

BRIEF DESCRIPTION OF THE DRAWINGS

Embodiments of the invention will now be described with reference to the accompanying drawings in which.

DETAILED DESCRIPTION OF THE PREFERRED EMBODIMENT

Figure 1:
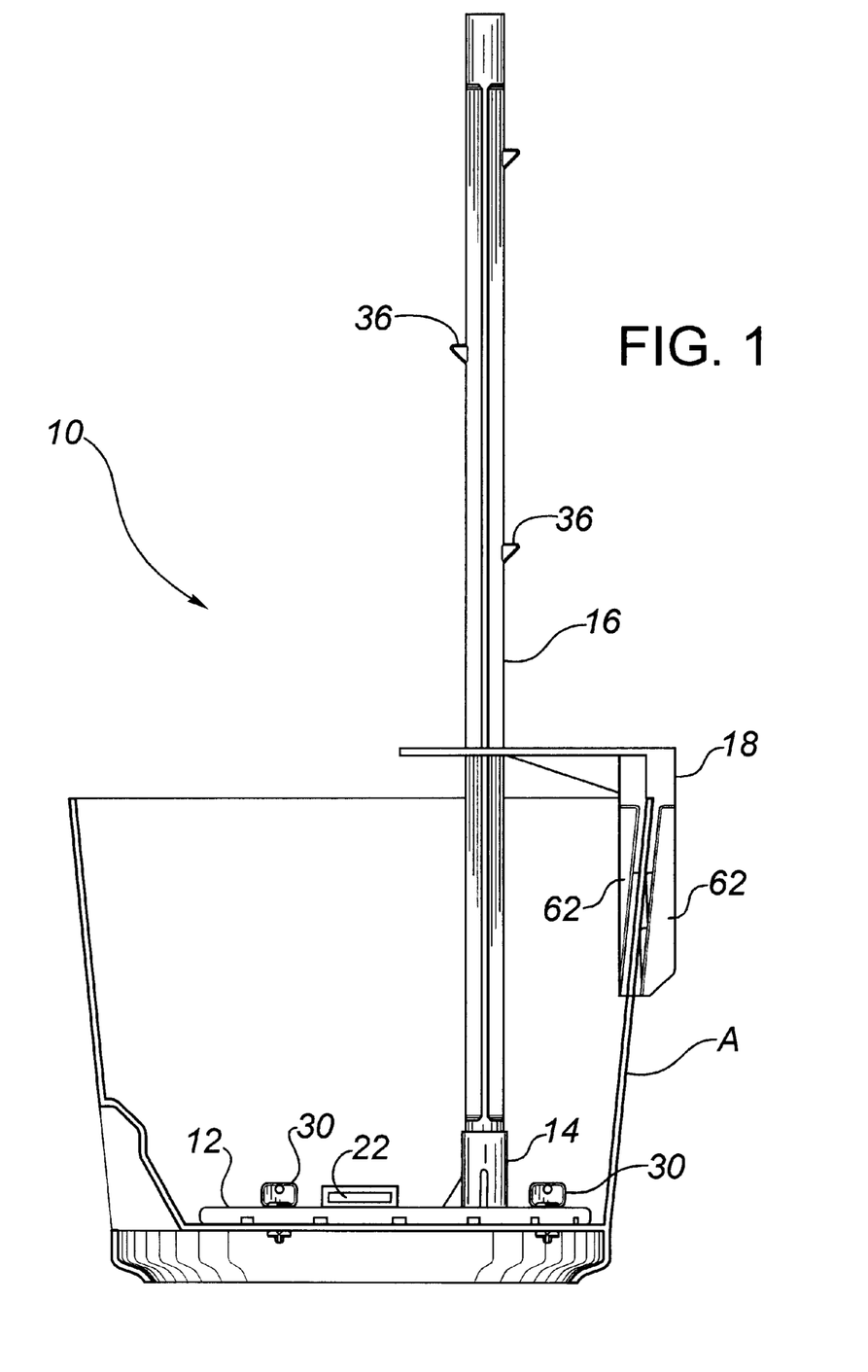
FIG. 1 is a side view of the preferred embodiment of the present invention showing a cut-away plant pot.
Figure 2:
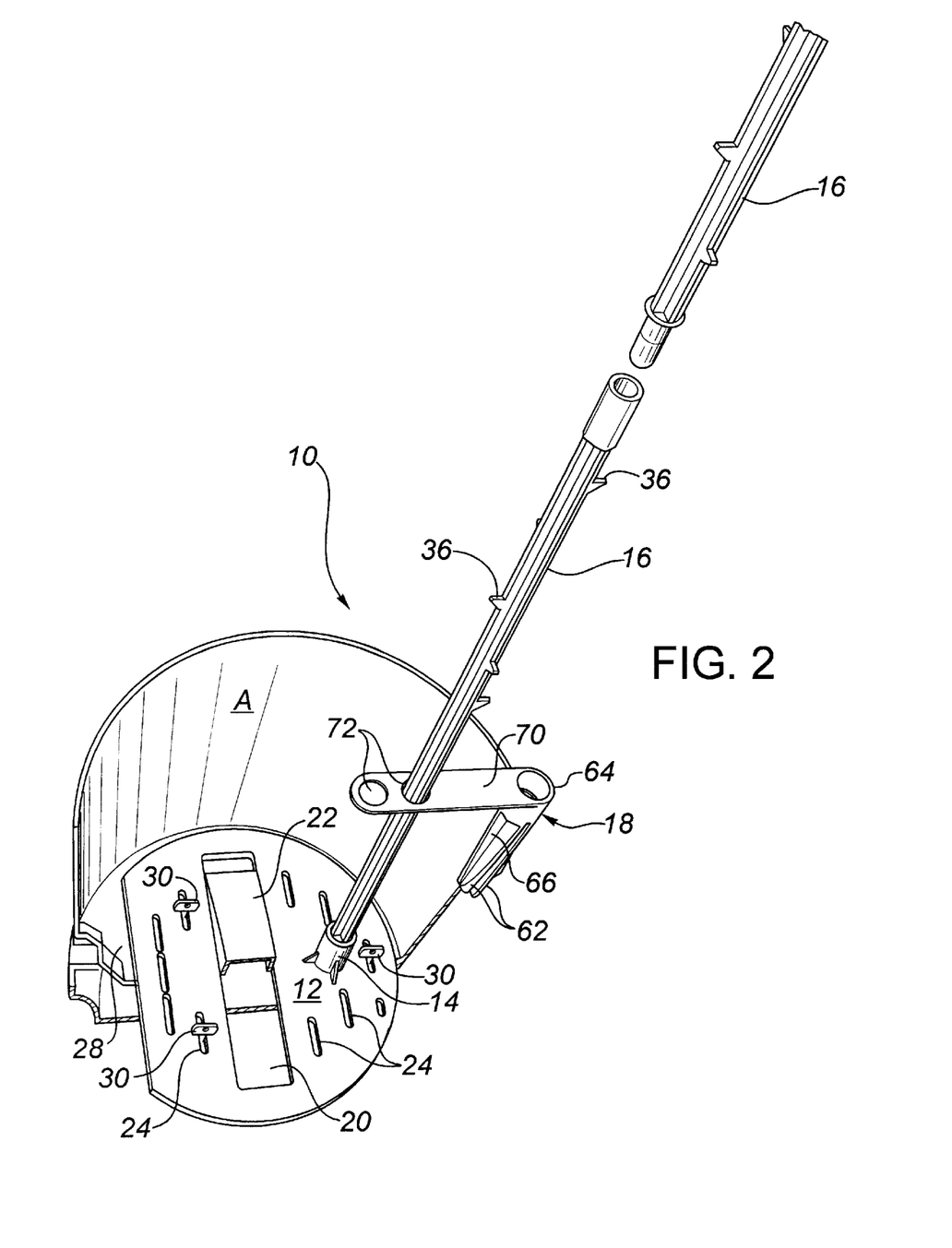
FIG. 2 is a perspective view of the preferred embodiment of the present invention showing the addition of a second plant support rod.

FIGS. 1 and 2 show an assembled plant support system (10) of the present invention. The system generally comprises a substantially flat base member (12), a socket (14), plant support rods (16) and a support clip (18).

In the preferred embodiment, the base member defines a central opening (20) which is necessary for use with typical self-watering pots. The pots (A) illustrated in FIGS. 1 and 2 are illustrative of self-watering pots manufactured and distributed by Nutron. Such pots have a raised arch (22) through which water may enter the pot (A) by capillary action. In the preferred embodiment, the opening (20) is rectangular to accommodate the arch (22) as shown in FIG. 2. However, it will be appreciated that the shape of the opening (20) may be varied to accommodate variations in the configuration of the self-watering pot.

Figure 7:
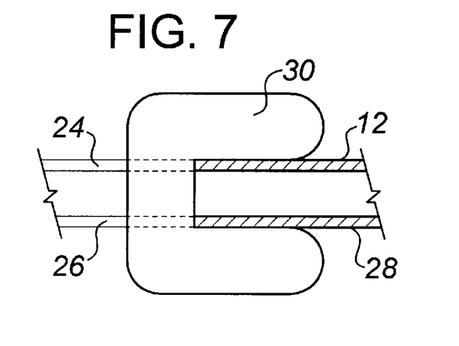
FIGS. 7 and 7A are side views of alternative locking keys of the present invention.
Figure 7A:
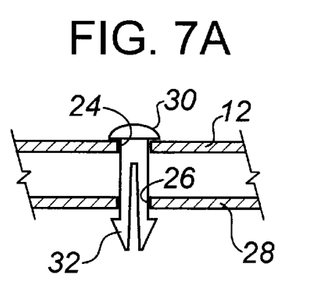

The base member (12) further defines a plurality of slot-like openings (24) which allow drainage through the base member (12). These openings (24) are positioned so as to be aligned with similar openings (26) in the bottom (28) of the pot (A). Means to secure the base member (12) to the pot (A) are provided. In the preferred embodiment, the pot securing means is a locking key (30) which has a head (31), an elongate probe (30a) and a crossmember (30b). The locking key (30) may be inserted into the slots (24) in the base member (12) and the corresponding slots (26) in the pot (A) until the head (31) rests against the base member (12), and then turned 90° to secure the base member (12) to the pot (A). The head (31) is slightly enlarged so as to not pass through the openings (24). As may be apparent, the distance between the head (31) and the crossmember (30b) should approximate the distance between the top of the base member (12) and the bottom (28) of the pot (A) so the key (30) fits tightly once it is turned into a locked position. Alternative configurations for the securing means is shown in FIGS. 7 and 7A. One alternative is a flat "C" shaped key (30) which may be inserted through the slot-like openings (24) in the base member (12) and the openings (26) in the bottom of the pot. The key (30) may then be slid longitudinally towards one end of the openings (24, 26) so that the arms (30a) of the key (30) lock the base member (12) and the pot bottom (28) together as shown in FIG. 2.

It will be appreciated that one skilled in the art may conceive of any number of possibilities for the configuration of the openings (24, 26) and the key (30). The configuration of the preferred embodiment shown in attached drawings is only illustrative of the invention and not intended to be limiting. For example, the openings may be circular and the key (30) may be cylindrical as shown in FIG. 7A. The key (30) may then have a ridge (32) which is compressible and elastic. The diameter of the ridge (32) will be slightly larger than the diameter of the opening (26) in the base of the pot. The key (30) may be pushed through the opening (26) so that the ridge (32) retains the key within the opening (26) thereby securing the base member (12) to the pot. In another alternative, the key (30) may be threaded to engage a nut which is secured to or part of the pot (A).

Preferably, the base member (12) has a plurality of ridges (31) which provide a slight separation between the base member (12) and the pot bottom (28). The base member (12) further defines a socket (14) for holding the plant support rod (16). The support rod (16) may be retained within the socket (14) by friction or the socket (14) and the rod (16) may be threaded to allow the rod (16) to be screwed into the socket (14). In the preferred embodiment, the socket (14) has two "L" shaped grooves while the rod (16) has two projections (not shown) such that the rod (16) may be inserted into the socket (14) and secured by twisting the rod (16) so that the projections engage the grooves. In another alternative, the base member (12), the socket (14) and the rod (16) may be fashioned as a unitary piece. The top end of the support rod (16) may engage the bottom end of an additional support rod (16) as shown in FIG. 2 again by friction fit or by threaded engagement.

Figure 3:
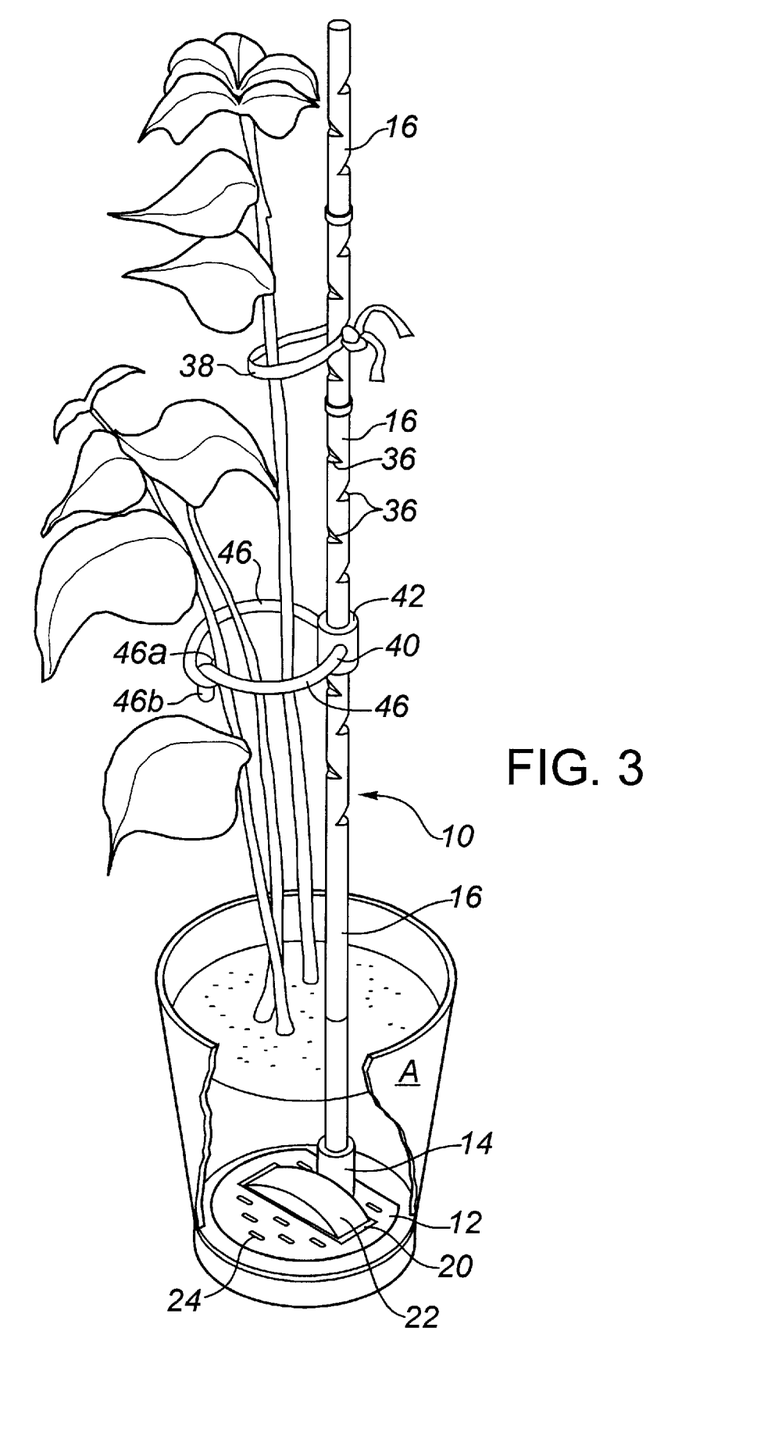
FIG. 3 is a perspective view of an alternative embodiment of the present invention.
Figure 5:
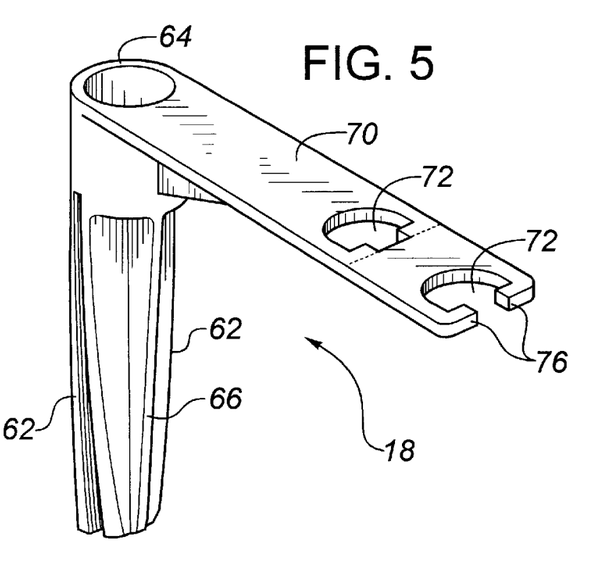
FIG. 5 is a perspective view of an alternative pot securing means.
Figure 6:
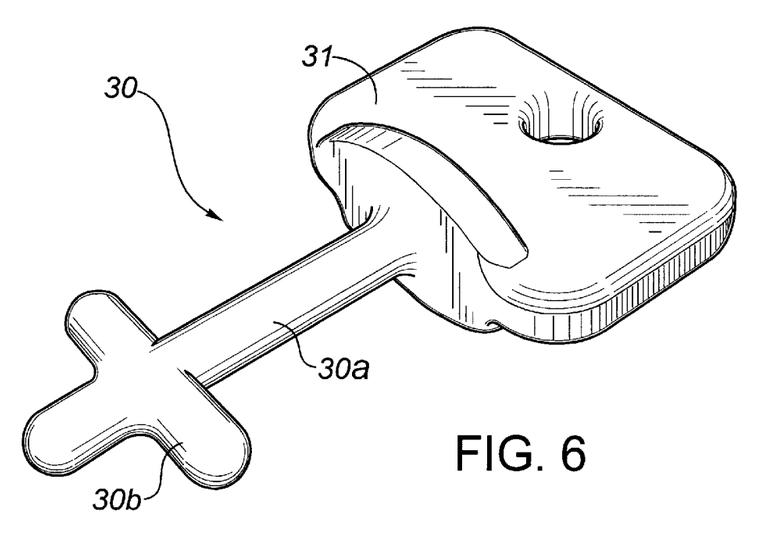
FIG. 6 is a perspective view of the preferred locking key.

The support rod (16) may be circular in cross-section in one embodiment shown in FIGS. 3 and 5 or, more preferably, cruciform as shown in FIGS. 1 and 2. The cruciform configuration causes the rod (16) to be more rigid. The exact configuration of the rod (16) is however not essential to the invention.

In the preferred embodiment, the rod (16) has a plurality of nodes or wedges (36) as shown in FIGS. 1 and 2. The wedges (36) engage a string tie (38) for securing the plant to the rod (16) or serve as a support for a plant support ring, which is described below. The wedges (36) may be distributed evenly along the length of the rod (16) and around the periphery of the rod (16). The nodes (36) have a horizontal upper support surface (36a) and an inclined lower surface such that the string tie (38) may not easily slip downward on the rod (16). Conversely, the tie (38) may easily be slid upwards to engage the next wedge (36) as the plant grows and as additional rods are added to the system (10). Alternatively, as shown in FIG. 3, the nodes (36) may be notches cut into the rod (16) which will perform the same function. A person skilled in the art will appreciate that various hooks, protrusions or shapes (not shown) along the rod (16) may perform the same function and are also illustrative of the invention.

The pot support clip (18) shown in FIGS. 1, 2, 4 and 5 provides additional support to the plant support rods (16) in the preferred embodiment. The clip (18) comprises vertical pot-engaging means and horizontal rod support means. In the preferred embodiment, the vertical pot-engaging means consists of two spaced-apart legs (62) which are configured to securely straddle the side of the pot (A). The two legs (62) meet at a head portion (64) which extends out as the horizontal rod support means. The legs (62) are supported and stiffened by gussets (66). The horizontal rod support means comprises an extension (70) or intermediate portion having at least one opening (72) through which the plant support rods (16) may pass through. Preferably there are two openings (72) along the extension (70) which permits use of the clip with different sized pots (A) and base members (12). Optionally, the extension (70) may be scored between the two openings (72) to permit the user to snap off the unused portion of the extension if the inner opening is being used. FIG. 5 shows an alternative clip configuration where, instead of circular openings (72) in the extension (70), rod engaging pincers (76) are used.

Figure 4:
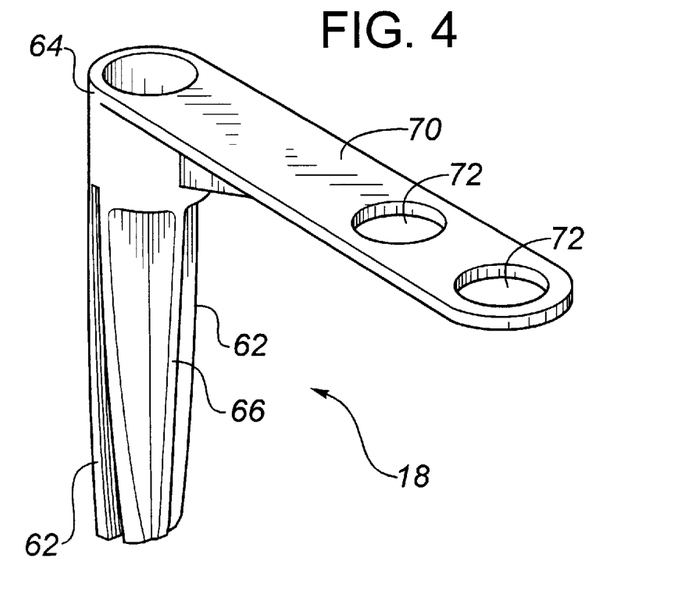
FIG. 4 is a perspective view of the pot securing means of the preferred embodiment of the present invention.
Figure 4A:
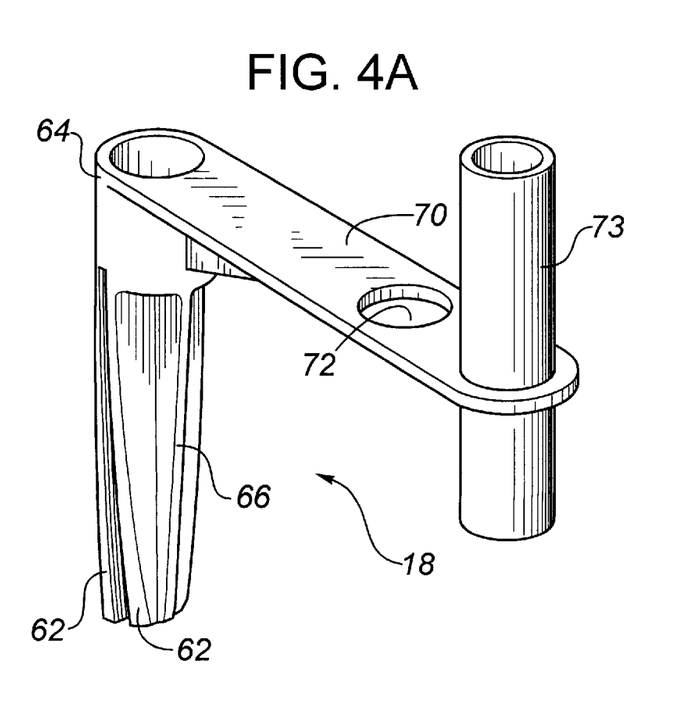
FIG. 4A is a view of an alternative pot securing means.

It is possible to use the support clip (18) without the base member. If additional support is desired, the support clip may be modified as is shown in FIG. 4A. In this modification, a sleeve (73) is provided instead of opening (72) which engages the plant support rod (16). This sleeve (73) laterally supports the rod (16), holding it in a vertical position.

Figure 8:
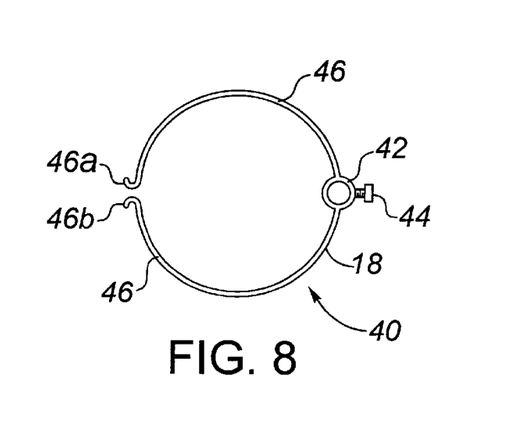
FIG. 8 is a top view of a preferred plant support ring.
Figure 9:
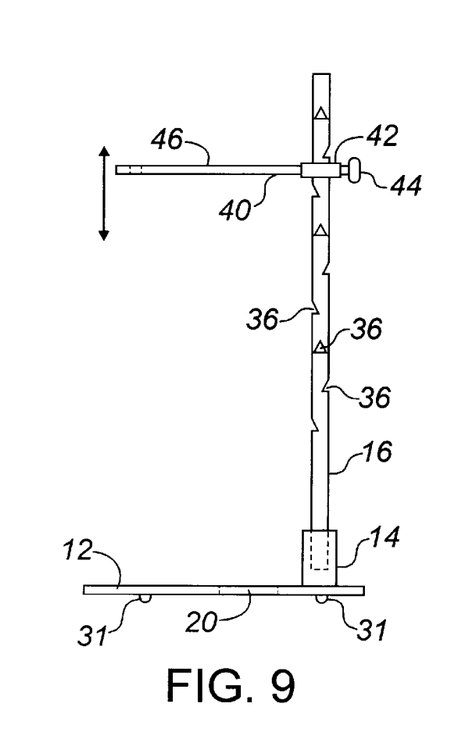
FIG. 9 is a side view of the plant support ring in position on the alternative embodiment of the present invention.

FIG. 8 shows a plant support loop (40) which may be used to secure the plant to the rods (16). In the preferred embodiment, the plant support loop (40) comprises a sleeve (42) which may slidingly engage the rod (16). The sleeve (42) should preferably have the same shape as the cross-sectional shape of the rod (16). Thus, if the rod has a cruciform cross-sectional shape, the sleeve (42) should also have a cruciform shape which permits to the sleeve (42) to slide up and down the rod. The sleeve (42) may then rest on the support wedges (36). In the preferred embodiment, the sleeve is open so that pulling on the arms (46) allows the sleeve (42) to be expanded such that the support loop (40) may be pulled past a wedge (36) in either direction. Alternatively, if the rod (16) is circular in cross-section and has notches (36) instead of wedges, the sleeve (42) may be cylindrical and closed as shown in FIG. 8. In that case, a set screw (44) may be provided to set the loop (40) at a desired height.

Two semi-circular arms (46) which each end in closing hooks (46a and 46b) extend from the sleeve (42). As shown in FIG. 3, the two closing hooks may engage each other to close the loop formed by the arms (46) and support the plant. Preferably, the arms are fashioned from a rigid material capable of elastic deformation so the arms (46) may be easily manipulated to engage and disengage the hooks (46a,b). It is further preferable if the hooks are at right angles to each other to facilitate engagement of each other.

Figures 10A, 10B, 10C:
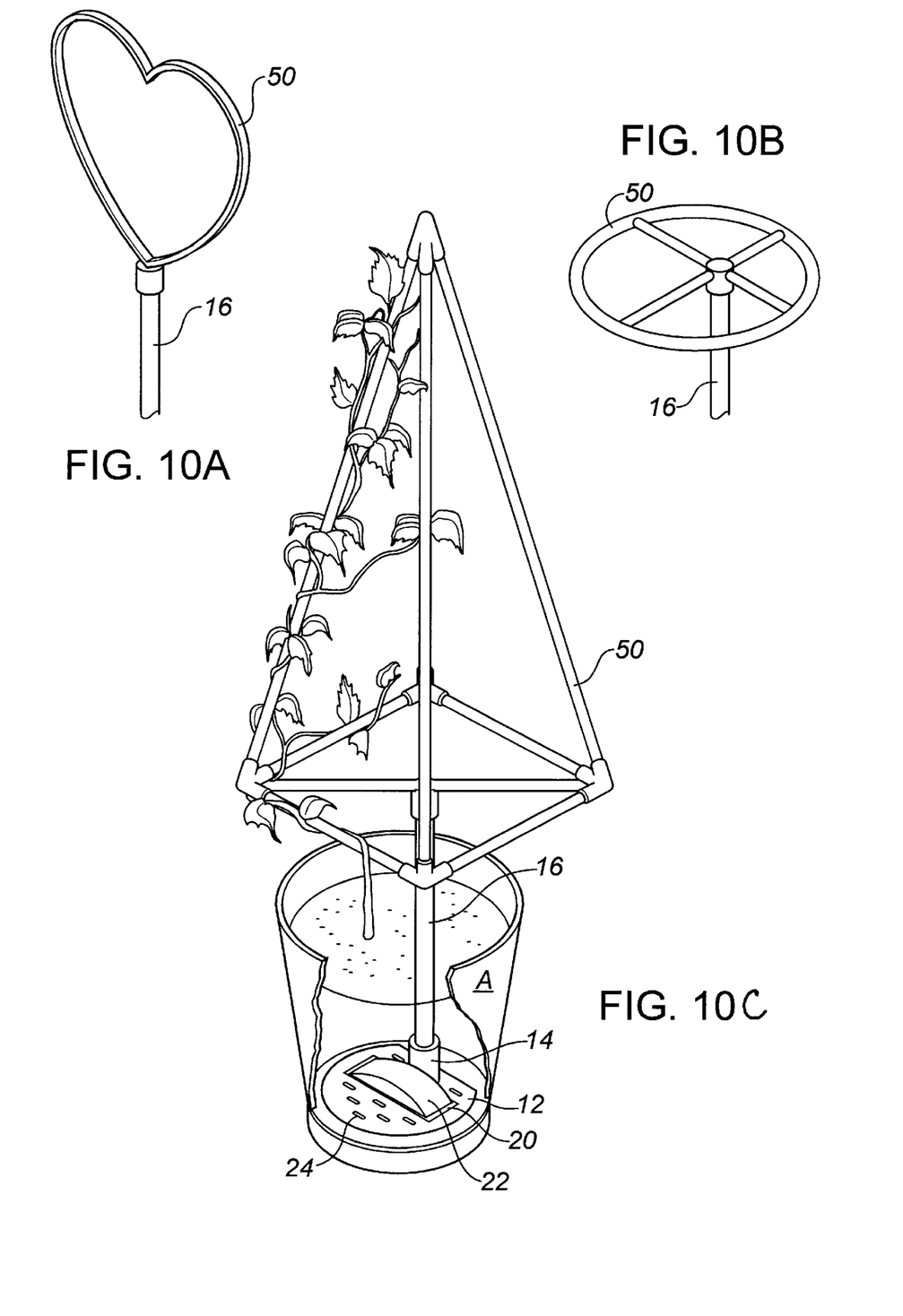
FIGS. 10A, 10B and 10C are views of the optional plant support accessories of the present invention..

FIGS. 10, 10A and 10B show alternative plant support accessories (50) which may be attached to a support rod (16) in the same fashion as other support rods (16). These accessories (50) may be used to support creeping house plants such as ivy by providing a support trellis. The plant may then grow and assume the shape of the accessory (50). The accessories (50) may be two-dimensional shapes such as in FIG. 10A or 10B or a three-dimensional shape as in FIG. 10. The exact shape of these alternative support accessories (50) is purely aesthetic and does not form part of the invention.

All material constituting the parts of this invention should preferably be relatively lightweight and rigid. While it is possible to use metals such as steel or aluminum, well-known injection molded plastics such as polyvinyl chloride (PVC), polystyrene ABS and the like are preferable.

As will be apparent to those skilled in the art, various modifications, adaptations and variations of the foregoing specific disclosure can be made without departing from the teachings of the present invention.

The embodiments of the invention in which an exclusive property or privilege is claimed are defined as follows:

1. A plant support system for use with a plant pot having a bottom inner surface having at least one aperture comprising:
   (a) a substantially flat base member which may lie at the bottom of the pot, the base member having at least one opening which aligns with the aperture of the pot;
   (b) means for removably securing the base member to the pot, said securing means extending through the at least one opening and the at least one aperture;
   (c) at least one plant support rod;
   (d) rod holding means associated with the base member for holding the plant support rod in a substantially vertical position.

2. The plant support system of claim 1 wherein the at least one plant support rod has a cruciform cross-sectional profile.

3. The plant support system of claim 1 wherein the rod holding means is a socket within which the plant support rod may be inserted.

4. The plant support system of claim 3 wherein the socket is threaded and the plant support rod has a complementary thread.

5. The plant support system of claim 1 wherein the securing means comprises a locking key comprising an elongate probe having a cross member which cross member and probe may be inserted into the at least one opening in the base member and the at least one aperture in the pot and may be turned to a locking position.

6. The plant support system of claim 1 wherein the securing means comprises a substantially flat "C" shaped key which inserts through the at least one opening in the base member and the at least one aperture in the pot and may be slid to a locking position.

7. The plant support system of claim 1 wherein the key means comprises a substantially cylindrical key which defines a flexible ridge and said ridge may be pushed in through, and resists being pulled out of the at least one opening and the at least one aperture.

8. The plant support system of claim 1 wherein the plant support rod or rods define a plurality of nodes for supporting a plant tie.

9. The plant support system of claim 8 wherein each node comprises a support wedge having an upper support surface and an inclined lower surface.

10. The plant support system of claim 8 wherein each node comprises a support notch having a lower support surface and an inclined upper surface.

11. The plant support system of claim 1 further comprising a plant support accessory which is removably attachable to the plant support rod or rods.

12. The plant support system of claim 11 wherein the plant support accessory comprises a rod attachment sleeve and two opposing extensions which may releasably engage each other to form a substantially circular plant support loop.

13. The plant support system of claim 12 wherein the base member is adapted to fit a self-watering pot.

14. The plant support system of claim 1 wherein the top end of the plant support rod defines a two or three dimensional structure which may support the plant.

15. The plant support system of claim 1 further comprising a support clip, said clip comprising a clamp for engaging a peripheral edge of a plant pot and a support rod positioner for engaging the plant support rod and restricting lateral movement of the rod.

16. The plant support system of claim 15 wherein the clamp comprises two opposing members which straddle the peripheral edge and wherein the support rod positioner comprises a horizontal member extending from the clamp and defining an opening through which the plant support rod may pass.

\* \* \* \* \*